US011263686B2

(12) United States Patent
Kobayashi (10) Patent No.: US 11,263,686 B2
(45) Date of Patent: Mar. 1, 2022

(54) METHOD, MEDIUM, AND SYSTEM FOR GENERATING CONTROL MESSAGES FOR RECOMMENDATIONS

(71) Applicant: Toshiba Global Commerce Solutions Holdings Corporation, Tokyo (JP)

(72) Inventor: Yoshiyasu Kobayashi, Chapel Hill, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 16/795,698

(22) Filed: Feb. 20, 2020

(65) Prior Publication Data

US 2021/0264494 A1  Aug. 26, 2021

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0641* (2013.01)

(58) Field of Classification Search
CPC .................. G06Q 30/0631; G06Q 30/0641
See application file for complete search history.

(56) References Cited

U.S. PATENT DOCUMENTS

| 7,668,821 B1* | 2/2010 | Donsbach ........... G06F 16/9535 707/765 |
| 9,245,271 B1* | 1/2016 | Ahmed ............... G06Q 30/0631 |
| 10,002,375 B1* | 6/2018 | Scythes .............. G06Q 30/0282 |
| 10,684,738 B1* | 6/2020 | Sicora ................. G06F 16/435 |
| 2004/0148226 A1* | 7/2004 | Shanahan .......... G06Q 30/0601 705/14.73 |
| 2008/0091549 A1* | 4/2008 | Chang ................ G06Q 30/0269 705/14.66 |
| 2009/0012704 A1* | 1/2009 | Franco ............... G01C 21/20 701/532 |
| 2012/0268252 A1* | 10/2012 | Lee ...................... H04H 60/52 340/10.1 |
| 2012/0303480 A1* | 11/2012 | Stone ................. G06Q 30/00 705/26.8 |
| 2014/0150029 A1* | 5/2014 | Avedissian ......... G06F 3/04842 725/60 |
| 2014/0207615 A1* | 7/2014 | Li ...................... G06Q 30/0623 705/26.61 |

(Continued)

OTHER PUBLICATIONS

Hearst, Marti A., and Daniela Rosner. "Tag clouds: Data analysis tool or social signaller?." Proceedings of the 41st Annual Hawaii International Conference on System Sciences (HICSS 2008). IEEE, 2008. (Year: 2008).*

*Primary Examiner* — Matthew E Zimmerman
(74) *Attorney, Agent, or Firm* — Coats + Bennett, PLLC (57) ABSTRACT

A network node associated with a retail store maintains personalized purchasing information identifying one or more products purchased by a customer. Each product is associated with one or more preference tags identifying a respective product category for the product, and indicating the customer's preference for products in that product category. Based on this information, the network node recommends products for the customer to purchase, and indicates those recommendations by controlling the customer's wireless device to visually indicate the location of the recommended products in the store.

18 Claims, 7 Drawing Sheets

(56) References Cited

U.S. PATENT DOCUMENTS

2015/0221010 A1* 8/2015 Ming ............... G06Q 10/087
                                                    705/26.61
2018/0293644 A1* 10/2018 Allen .............. G06Q 30/0639
2020/0387948 A1* 12/2020 Kurani ............ G06Q 30/0222

* cited by examiner

PROCESSING CIRCUITRY
110

COMMUNICATIONS INTERFACE UNIT/MODULE
120

PREFERENCE TAG ASSIGNMENT UNIT/MODULE
122

PRODUCT DATA STORAGE UNIT/MODULE
124

RECOMMENDED PRODUCT DETERMINING UNIT/MODULE
126

LOCATION DETERMINATION UNIT/MODULE
128

CONTROL MESSAGE GENERATING UNIT/MODULE
130

CUSTOMER INDICATION UNIT/MODULE
132

FIG. 7

METHOD, MEDIUM, AND SYSTEM FOR GENERATING CONTROL MESSAGES FOR RECOMMENDATIONS

TECHNICAL FIELD

The present disclosure relates generally to retail environments, and more particularly to product recommendation systems for customers in a retail store.

BACKGROUND

Retailers often use recommendation systems to maintain customer relationships and provide attractive shopping experiences to consumers. Although such systems are powerful tools for the retailers, conventional recommendation systems are often expensive, complicated, and difficult to maintain. One particular issue with conventional systems is that retailers must rely on product vendors to first provide the information on which recommendations are based, and thereafter, to update that information in order to maintain the system. Additionally, in many situations, conventional recommendation systems are operatively interconnected with the retailers' customer profile information. And while the additional information may provide retailers with a rudimentary understanding of what products a given customer may find desirable, it only adds to the complexity and cost of a conventional recommendation system. For one thing, the interoperability with the customer profile information means that there is more than one system to maintain. Further, while there can be some overlap in the data that the systems store, each typically maintains different types of information. Moreover, the types of data that "link" a given customer to a particular product are usually fixed and inflexible. That is, the links are often predefined by the retailer and/or the vendors, and may not reflect what some customers may actually consider desirable for purchasing.

Thus, conventional recommendation systems are complex, require a high-performance computing environment, and difficult to maintain accurately without having to pay for a vendor or other third party to update and oversee the system. Additionally, because the information on which the recommendations are based may not actually reflect what customers deem desirable, the personalized recommendations made by such conventional systems are not always accurate.

DETAILED DESCRIPTION

Embodiments of the present disclosure provide a personalized product recommendation system for the customers of a retail store. In one embodiment, for example, the system maintains a database of information related to the products customers purchase. Such information includes the locations of the products on display in the store, the stock keeping unit (SKU) of each product, and other information as needed or desired. The system also obtains one or more "tags" that associate the product with one or more product categories, and assigns those tags to the SKU of the products.

By way of example only, a customer may provide a "tag" identifying a given product he/she is purchasing as being a "FAIR TRADE" product or a "LOW PRICE" product. Alternatively, the system may provide a tag autonomously based on information it obtains when the customer scans the product or places the product into a cart. To accomplish this function, the system may utilize existing cameras to capture digital images of the product being purchased and perform an image analysis on those images. Then, based on a result of the analysis, the system can identify the products and determine which tags, if any, are to be associated with the product. Over time, the system can use the tags to learn what categories of products the customer is most interested in, and recommend products from those categories for the customer to purchase.

To indicate the recommended product to the customer, one embodiment of the present disclosure configured the system to generate and send data messages to the customer's mobile device. The control messages control the mobile device to launch a Graphical User Interface (GUI) illustrating a map of the retail store. Additionally, the messages also identifies the recommended product to the customer, indicates the location of the recommended product in the store, and indicates the customer's current position in the store relative to the location of the recommended product. In at least one embodiment, the system can also provide data that controls the GUI to illustrate a path through the store from the customer's current position to the location of the recommended product, and accepts customer input that identifies the categories that the system will associate with the SKUs.

The present embodiments provide benefits and advantages that conventional systems do not provide. For example, not only do the "tags" of the present disclosure categorize the products purchased by a customer into product categories, but they also indicate the customer's personal preference for products in those categories. Further, because the system identifies the customer's preferred product categories, the recommendations of the system are personalized, and more accurate, for a given customer. Not only does such accuracy enhance the shopping experience for the customer, but it also greatly reduces, or negates completely, the need for retailers to pay a vendor or other third-party to help maintain their recommendation system. Such reduced or eliminated costs allow retailers to pass those savings onto the customer, and thereby leads to increased business.

Figure 1:
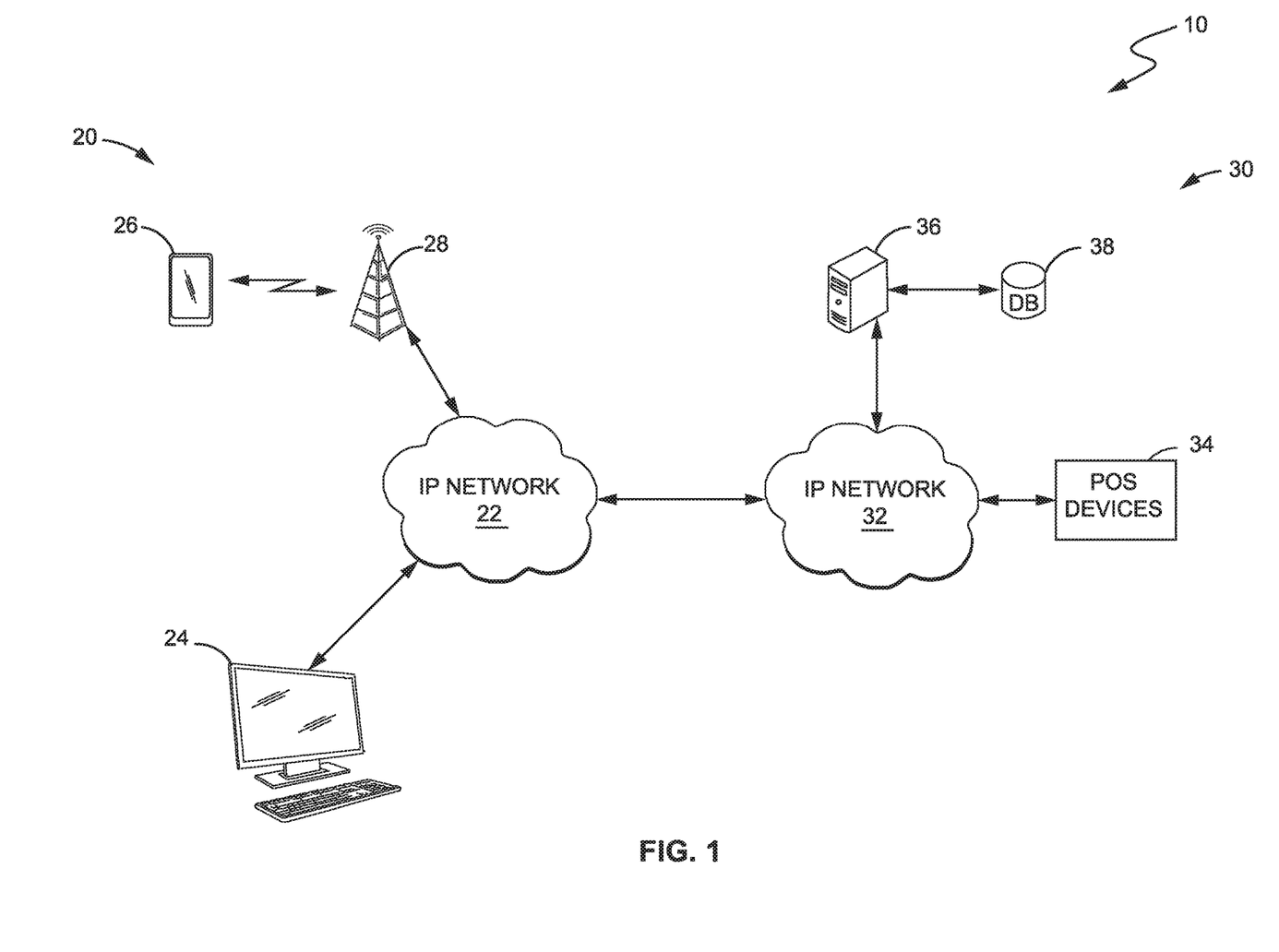
FIG. 1 is block diagram illustrating a communications system configured according to one embodiment of the present disclosure.

Turning now to the drawings, FIG. 1 illustrates some of the components of a communications system 10 configured according to one embodiment of the present disclosure. Those of ordinary skill in the art will readily appreciate that the components seen in system 10 are merely illustrative, and that other components may be present in communications system 10 that are not explicitly illustrated in the figure.

As seen in FIG. 1, communications system 10 comprises a Wide Area Network (WAN) 20 configured to provide consumers with access to e-various commerce systems associated with a retail network 30. In this embodiment, WAN 20 comprises one or more private and/or public IP networks 22 (e.g., the Internet) communicatively connected to a mobile device 26 (e.g., a customer's smartphone or tablet) via a wireless communications network 28, and a computing device 24 (e.g., the customer's home or work-based desktop or laptop computer). The particular technical operation of these components is well-known in the art, and thus, not described in detail here; however, it is sufficient to understand that by using computing device 24 and/or mobile device 26, customers are able to access an e-commerce website associated with retail network 30 to purchase products from the retailer.

Retail network 30 is associated with a retail store. As seen in this embodiment, retail network 30 comprises one or more private and/or public IP networks 32 that communicatively connect to IP network 22, one or more POS devices 34 (e.g., POS terminals, kiosks, a frictionless shopping system (including the computers, cameras, and/or sensors associated with such systems), mobile POS terminals carried by store employees, and the like), and a network node 30 connected to a database (DB) 38.

In operation, information about a product, such as the SKU, is obtained by network 30 whenever a customer scans the product at a POS device 34. Additionally during this time, network 30 identifies the customer. For example, in addition to the product information, DB 38 also maintains customer information. According to the present disclosure, network 30 can identify the customer based on the contents of a loyalty card scanned by the customer. For example, network 30 may compare an identifier read from the customer's loyalty card to the customer information maintained in DB 38. Provided there is a match, network 30 can identify the customer. Identification of the customer in the present embodiments, therefore, can be a matter of matching an identifier indicated on the customer's loyalty card to an identifier stored in DB 38.

Those of ordinary skill in the art should appreciate, however, that other ways of identifying a customer can be used. For example, consider a store appropriately configured with a plurality of cameras and/or other sensors that capture digital images of the customers in the store. Such images may be captured when the customers enter the store, when the customers exit the store, and/or as the customers walk through the store. Using any of a variety of known face recognition techniques, components in network 30 are configured to subsequently analyze the images to identify the customer. In these cases, the customer information maintained by the retailer in DB 38 would also include the customer's biometric data. Alternatively, such biometric data can be stored in other devices; however, such data would need to be accessible to the components of network 30.

Regardless of how customer identification is performed, however, POS device 34 is configured according to the present embodiments to receive or obtain one or more "tags" to be assigned to a product being scanned by the customer. According to the present embodiments, each "tag" is an alpha-numeric descriptor that indicates a product category to be assigned to the product being purchased. Some examples of tags and their associated categories include, but are not limited to:

| TAG/CATEGORY | DESCRIPTION |
| --- | --- |
| LOW PRICE | Assigned to products that the customer believes to be inexpensive relative to other similar products |
| BRAND | Assigned to all products of a specified brand identified by BRAND |
| TRENDING | Assigned to products that are currently trending |
| NEW PRODUCT | Assigned to newly released or newly launched products. In these cases, the customer may provide a release date to be considered |
| ECO-FREINDLY | Assigned to products that the manufacturers claim are environmentally friendly |
| SMALL FOOT PRINT | Assigned to products that are regionally or locally manufactured |
| ORGANIC | Assigned to products that are certified organic |
| SMALL AMOUNT | Assigned to products that are sold in small amounts |

The tags may be input directly by the customer using a keypad or other interface at POS device 34. Alternatively, in one embodiment, network 30 is configured to automatically determine the one or more tags for the product based on the product information stored in DB 38.

It should be noted that, according to the present embodiments, the customer need not provide a tag for each product he/she purchases. Rather, the customer may provide a tag only for those products of a category that he/she is interested in. Thus, the tags also function as an indicator of whether the customer prefers products from certain categories.

For example, consider a customer who, over time, purchases mostly organic products, but relatively few products that are currently popular or "trending." According to the present embodiments, the customer would provide respective "tags" of "ORGANIC" or "TRENDING" for the products he/she purchased. Alternatively, network 30 may automatically categorize the products when the customer scans the products or places them into a shopping cart, as previously described. Based upon an analysis of this data, network 30 might determine that the customer's preference for organic products is greater than the preference for products that are currently popular and trending. Similarly, if a customer were to purchase (and tag) more "LOW-PRICE," "ECO-FRIENDLY," and "ORGANIC" products than "TRENDING" products network 30 would determine that the customer's preference for organic products that are eco-friendly and priced low (e.g., on sale or below a threshold price) is greater than the customer's preference for products that are currently trending.

Thus, according to the present embodiments, customers may "tag" one or more products they purchase with one or more tags at checkout, for example, to have network 30 associate the tag(s) corresponding product categories to that product. Then, over time, network 30 can interpret the number of times the customer provided tags for products in a given category as an indication of whether the customer prefers products from that category. For example, a customer may prefer products in categories represented by a high number of tags in DB 34 over products in categories represented by a low number of tags in DB 34. Such information is beneficial when recommending various products to a customer, as will be described in greater detail below.

Those of ordinary skill in the art should appreciate that the present embodiments are not limited to situations where the customer is physically located in the retail store and actively purchasing a product. In other embodiments, for example, such information may be provided by a customer via computer 24 or mobile device 26. By way of example only, the customer may order (and/or purchase) products using a retailer's website accessed via networks 20 and 30. In these cases, the customer can provide network 30 with the one or more tags for a product using a GUI provided by the retailer. However, regardless of how or where a customer makes a purchase, network 30 is configured according to the present embodiments to determine, based on the tag(s), whether the customer prefers products in one category over products in another category, and to recommend products to the customer from the preferred category.

Additionally, regardless of whether the customer is physically located in the retail store and interfacing with a POS device 34 to tag a product, or is using computer 24 or mobile device 26 to tag the product, embodiments of the present disclosure further allow the customer to add, modify, and/or delete tags assigned to the products independently from ordering and/or purchasing the product.

For example, in one embodiment, the customer utilizes the GUI provided by, or associated with, the retailer to add tags to the products. In other embodiments, the customer utilizes the GUI to modify or delete existing tags assigned to the products. Such functions can be performed, for example, at the time the customer orders or purchases the product, or after the customer purchases the product and has gone home.

Further, while some of the embodiments of the present disclosure use predefined alpha-numeric descriptors for the tags, other embodiments allow the customers to provide their own, arbitrary alpha-numeric tags to assign to the products. This latter aspect allows customers to categorize his/her preferred products using their own, natural language, custom tags comprised of arbitrary alpha-numeric text rather than having to use predefined tags that may or may not accurately reflect the product categories the customer prefers.

Once the tag(s) are received or determined, network 30 assigns the tag(s) to the product, and stores the assignment in DB 38. For example, as seen in the below table, network 30 maintains a record in DB 38 for each product in inventory. Each product is further associated with a SKU. To assign the tag(s) to a particular product, one embodiment of network 30 updates the appropriate record in DB 38 to include the tag(s), thereby assigning the tag(s) to the SKU of the given product. Products that are assigned multiple tags by the customer can, for example, be identified in a list.

| PRODUCT | SKU | TAG/CATEGORY |
| --- | --- | --- |
| PRODUCT A | 1788KJ45 | LOW PRICE |
| PRODUCT B | 2448GJ03 | LOW PRICE, BRAND |
| PRODUCT C | 00988FF72 | LOW PRICE, TRENDING |
| PRODUCT D | 4453KJ35 | NEW PRODUCT |
| PRODUCT E | 3418KSS3 | LOW PRICE ORGANIC, ECO-FREINDLY |
| PRODUCT F | E4428RJ75 | SMALL FOOT PRINT |
| PRODUCT G | 1HY667J33 | ORGANIC |

-continued

| PRODUCT | SKU | TAG/CATEGORY |
| --- | --- | --- |
| PRODUCT H | E4457096RT | SMALL AMOUNT, SMALL FOOT PRINT |

As stated above, and as described in more detail later, network 30 is configured to analyze the data records stored in DB 34 to determine which category or categories of products, if any, a given customer prefers. Network 30 then recommends products from those categories to the customer for purchase.

For example, network 30 may provide information to the customer's mobile device 26 that identifies the recommended product. Such information may comprise one or more commands that, when received at the customer's mobile device 26, cause the mobile device 26 to launch a GUI application. The GUI may, for example, display a map reflecting a layout of the retail store. Based on the received information, the GUI can display corresponding icons indicating the current location of the customer in the retail store, and the location of the recommended product in the retail store. In some embodiments, the information provided to the GUI also controls the GUI to display a path through the store from the customer's current location to the location of the recommended product.

According to one aspect, the embodiments of the present disclosure periodically refresh the GUI on display to visually indicate the customer's current position in the retail store as the customer moves through the retail store. Additionally, the information provided to the customer's mobile device 24 may comprise a digital image of the recommended product along with some descriptive text for display to the customer on the GUI. In some cases, the information may also comprise an electronic coupon that the customer can use to purchase the recommended product.

Figure 2:
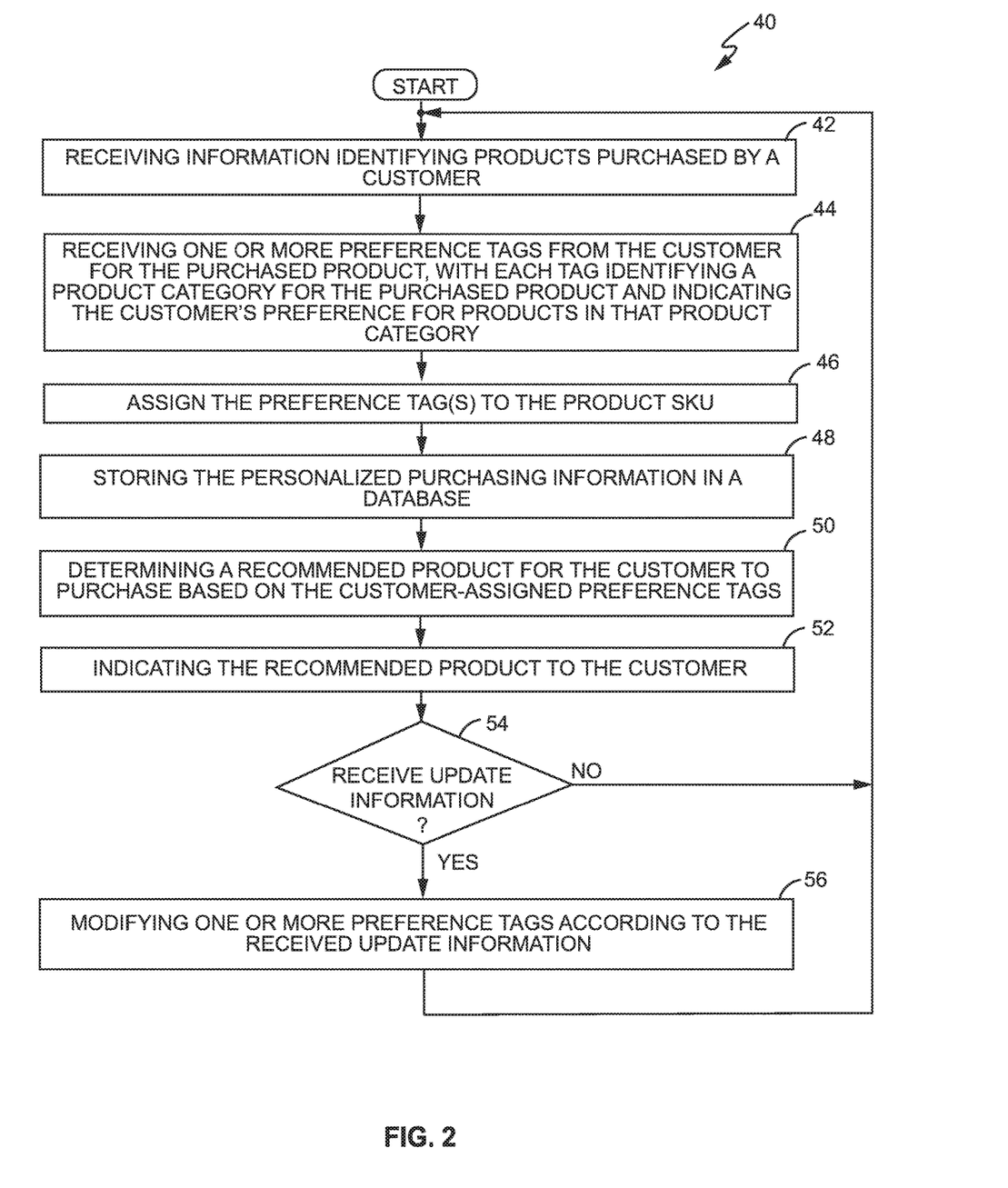
FIG. 2 is a flow diagram illustrating a method for identifying a recommended product for a given customer, and indicating that recommended product to the given customer according to one embodiment of the present disclosure.

FIG. 2 is a flow diagram illustrating a method 40 for identifying a recommended product for a given customer, and for indicating that recommended product to the given customer according to one embodiment of the present disclosure. It should be understood that method 40 can be implemented by any computing device in network 30, or in a distributed manner on multiple computing devices in network 30. However, merely for illustrative purposes, this embodiment of method 40 is implemented by network node 36.

As seen in FIG. 2, method 40 begins with network node 36 receiving information that identifies a product being purchased by a customer (box 42). As stated previously, a POS device 36 may send the information (e.g., the SKU of the product) to the network node 36 when the customer scans the product at the POS device 34. Alternatively, computer 24, mobile device 26, or an application server (not shown) hosting a website for the retailer may send information about the product to network node 36 when the user orders the product from the website. Network node 36 also receives one or more preference "tags" from the customer (or from the device used to scan the product) for the purchased product (box 44). Each preference tag identifies a product category for the product being purchased, and indicates the customer's preference for products in that category. Responsive to receiving the product information and the preference tag(s), network node 36 assigns the tag(s) to the SKU of the product (e.g., by adding the preference tag(s) to the list of tags associated with the SKU in DB 38) (box 46), and stores the assignment in DB 38 (box 48).

Thereafter, network node 36 then analyzes the data stored in DB 38. Based on the analysis of the preference tags stored in DB 38, network node 36 determines a recommended product for the customer to purchase (box 50) and indicates that recommended product to the customer (box 52).

Thereafter, network node 36 may receive information from the customer updating the tag(s) for one or more products (box 54). Provided such update information is received, network node 36 is configured according to the present embodiments to update the existing information in DB 38. For example, network node 36 may add tags to existing product SKUs in DB 38, or modify or delete one or more tags in DB 38 currently assigned to a given product (box 56). If no information is received, however, method 40 simply returns to receiving the information identifying the products purchased by the customer.

Figure 3:
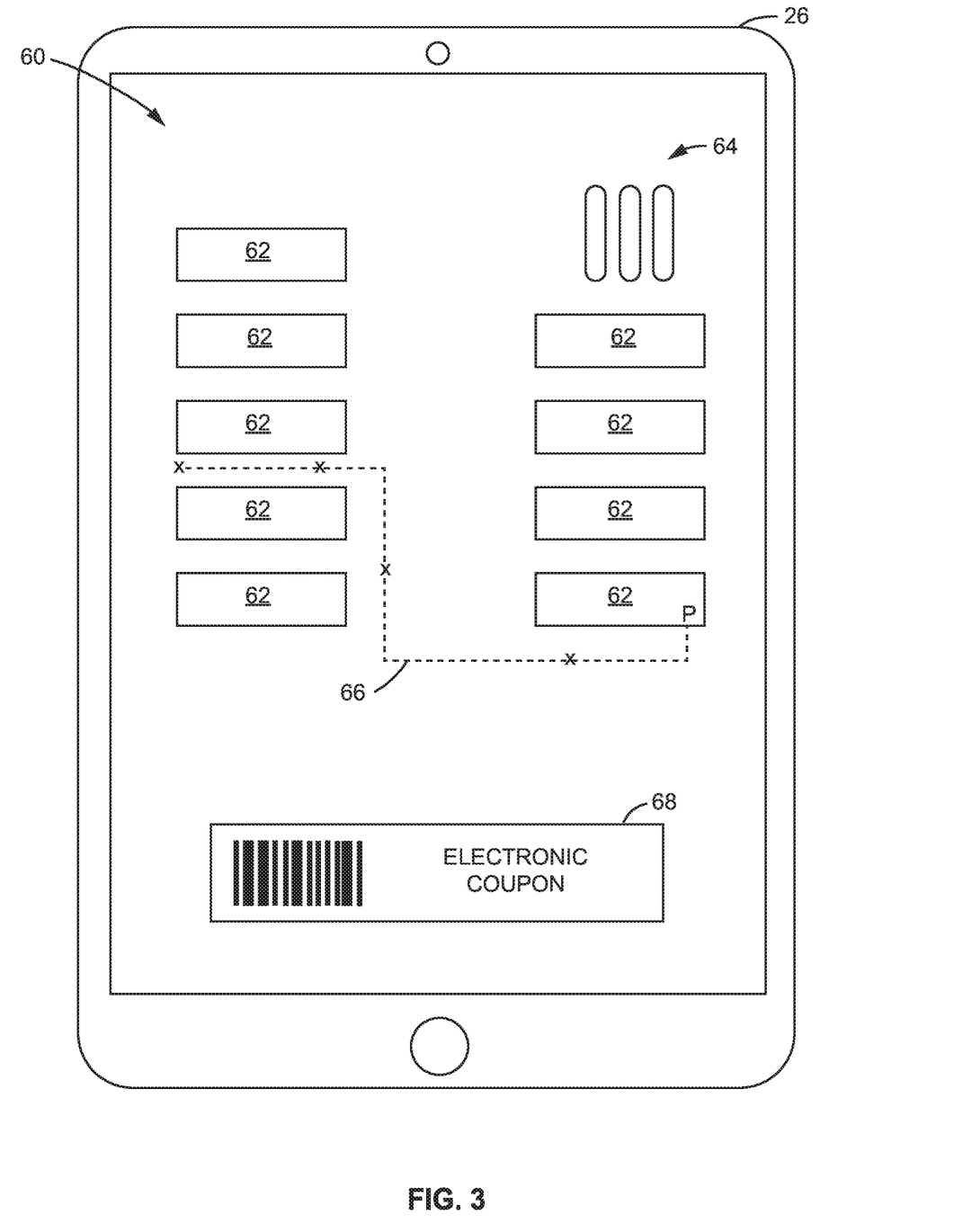
FIG. 3 illustrates a Graphical User Interface (GUI) on a display of a customer's mobile device configured according to one embodiment of the present disclosure.

FIG. 3 illustrates a GUI 60 on a display of a customer's mobile device 26 configured according to one embodiment of the present disclosure. As stated previously, GUI 60 is launched on mobile device 26 responsive to receiving a command from network node 36. The command may be sent to mobile device 26 on its own, or as part of a control message sent by network node 36 to mobile device 26.

As seen in FIG. 3, GUI 60 illustrates a layout of a retail store. As such, GUI 60 in this embodiment is configured to show the positions, for example, of the shelving 62 and a checkout area 64. Additionally, GUI 60 displays various icons representing different aspects. In this embodiment, the "P" indicates the current location of the product, the "x" indicates the customer's current position in the store, and the dotted line 66 indicates a possible path for the customer to take to the position of the recommended product on shelf 62 from his/her current location in the retail store. Additionally, the information sent by the network node 36 may include an electronic coupon 68 for display to the customer. Such coupons can, for example, help entice at least some customers to purchase the recommended product.

Figure 4:
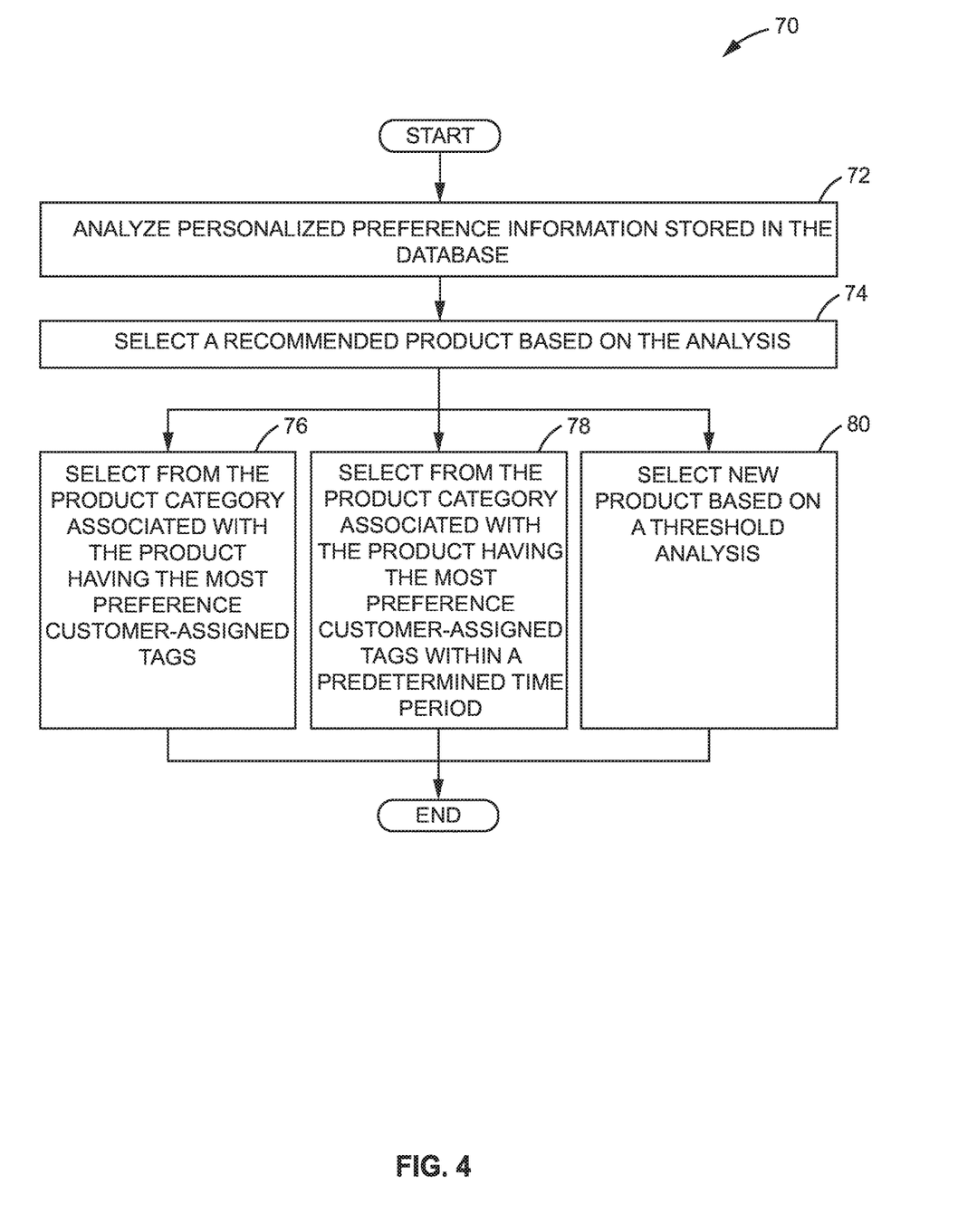
FIG. 4 is a flow diagram illustrating some exemplary methods for identifying a recommended product according to embodiments of the present disclosure.

FIG. 4 is a flow diagram illustrating a method 70 for identifying a recommended product according to embodiments of the present disclosure. In this embodiment, network node 36 analyzes the personalized preference information stored in DB 38 (box 72). Such information includes the tag(s) provided by the customer and that are to be assigned to the products. Based on the results of that analysis, network node 36 selects a recommended product from a category of products the customer finds preferable to indicate to the customer (box 74).

Network node 36 can be configured to perform any of a variety of analyses to select a product to recommend to the customer. For example, in one embodiment, network node 36 counts the number of tags in each given product category, and selects a product from the category having the highest number of tags (box 76). In another embodiment, network node 36 is configured to select a product from the category having the highest number of preference tags within a predetermined time period (e.g., the highest number of preference tags assigned to products in a given category within the last month) (box 78). In this latter embodiment, the category from which the recommended product is to be selected may not have the highest number of customer-assigned preference tags overall. However, it is still beneficial in that network node 36 is able to determine the types of products the customer has been most recently interested in. Thus, the recommendation in this embodiment is considered "time-qualified."

For example, consider a customer who has provided a tag of "LOW PRICE" for most of the products he/she has purchased in the last year. However, for the last month, the customer tagged most of the products he/she purchased with a tag of "ORGANIC." Network node 36 is therefore configured to apply a date-range filter in the analysis to recognize that the customer has recently altered his/her habits from buying mostly LOW PRICE products to buying mostly ORGANIC products. So informed, network node 36 is configured to tailor the selection of a recommended product for the customer from those labeled with an ORGANIC tag rather than a LOW PRICE tag.

The data for the filters can be provided and/or altered at any time. For example, in some embodiments, the customer provides and/or modifies the date(s) defining the date range filter, while in other embodiments, the retailer provides and/or modifies the date(s) defining the date range filter.

In yet another embodiment, the present disclosure selects a product to recommend to the customer based on a threshold analysis (box 80). For example, customers (or the retailers) may provide a threshold value setting a minimum tag count (MIN) for a category. In some embodiments, the MIN threshold value is a global value applied to all categories, while in other embodiments, each different category has its own respectively defined MIN threshold value. Regardless, responsive to determining that the number of tags assigned to a first category meets or exceeds the MIN threshold value for that category, network node 36 will recommend products from that category. However, responsive to determining that the number of tags assigned to the first category is less than the predefined MIN threshold value, network node 36 will avoid recommending products in the first category until the number of tags assigned in that first category meets or exceeds the MIN threshold.

In another embodiment, network node 36 selects the recommended product based on a release date for the product. In these cases, DB 38 maintains a release date as an attribute for each product category. Network node 36 is configured to compare these release dates stored in DB 38 to a current date, and to add the "NEW PRODUCT" tag to a product in that category when that product is released, or is released within a predefined number of days. The customer or the retailer may define the number of days. This embodiment allows network node 36 to recommend newly released or updated products of a certain category to the customer.

Regardless of how network node 36 selects a recommended product, network node 36 is configured to indicate the recommendation to the customer in any of a variety of ways. For example, FIG. 5 is a flow diagram illustrating a method 90 for controlling a customer's mobile device 26 to launch GUI 60 to indicate the location P of the recommended product in the retail store according to one embodiment of the present disclosure.

Figure 5:
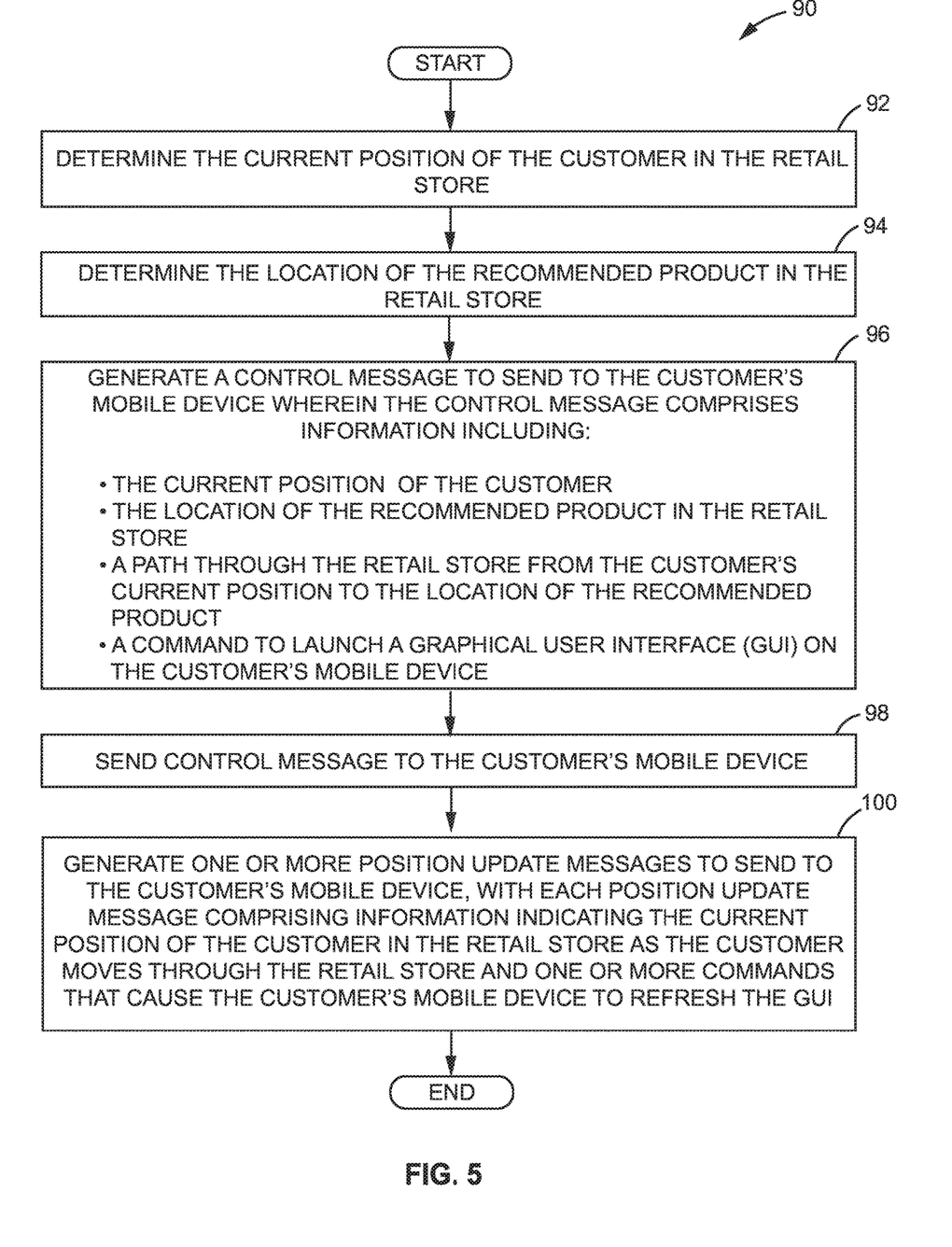
FIG. 5 is a flow diagram illustrating a method for controlling a customer's mobile device to launch a GUI to indicate the location of the recommended product in the retail store according to one embodiment of the present disclosure.

As seen in FIG. 5, method 90 begins with network node 36 determining the current position of the customer in the retail store (box 92). Such information may be determined using any of a plurality of known methods. For example, in one embodiment, network 30 further comprises a plurality of cameras (e.g., security cameras) distributed throughout the store. The cameras capture digital images of the customer as he/she moves throughout the store and provides those them to network node 36. Upon receipt, network node 36 is configured to analyze the digital images using any of a variety of known image analysis techniques, and based on that analysis, determine the customer's position x in the store.

Network node 36 is then configured to determine the location P of the recommended product in the retail store (box 94). For example, the network node 36 can be configured to obtain information about the recommended product from a product database in DB 38. Such information includes, but is not limited to, whether the product is currently stocked, the location of a particular shelf in the store on which the product is displayed, and the location P of the recommended product on the particular shelf. Network node 36 then generates a control message to send to the customer's mobile device 26 (box 96). The control message is generated, as described below, not only to provide information about the recommended product to the customer, but also to control the customer's mobile device 26 to assist the customer in locating the recommended product in the store. Therefore, in one embodiment, network node 36 generates the control message to include:

- the current position x of the customer in the retail store as determined by network node 36;
- the location P of the recommended product in the retail store (e.g., the locations of a given shelf and of the product on the given shelf) as determined by network node 36;
- data indicating a path 66 through the retail store from the customer's current location to the location P of the recommended product;
- a command executable by mobile device 26 upon receipt that causes mobile device 26 to launch GUI 60 for display to the customer illustrating the current position x of the customer, the location P of the recommended product in the store, and the path 66 through the store to the recommended product; and
- one or more electronic coupons 68 that the customer may use to purchase the recommended product.

Network node 36 then sends the control message to the customer's mobile device 26 (box 98). Upon receipt, the customer's mobile device 26 launches GUI 60 to display the information received in the control message and displays the electronic coupon 68 to the customer.

Additionally, in at least some embodiments, network node 36 is configured to track the customer's position x as the customer moves throughout the store. In these cases, network node 36 can generate one or more position update messages to send to the customer's mobile device 26 (box 100). Each position update message comprises data indicating the customer's current position x as the customer moves throughout the store, as well as an executable command to control the mobile device 26 to refresh GUI 60. In this manner, network node 36 can control the customer's mobile device 26 to ensure that GUI 60 shows the customer's current position x as the customer moves towards the recommended product.

Figure 6:
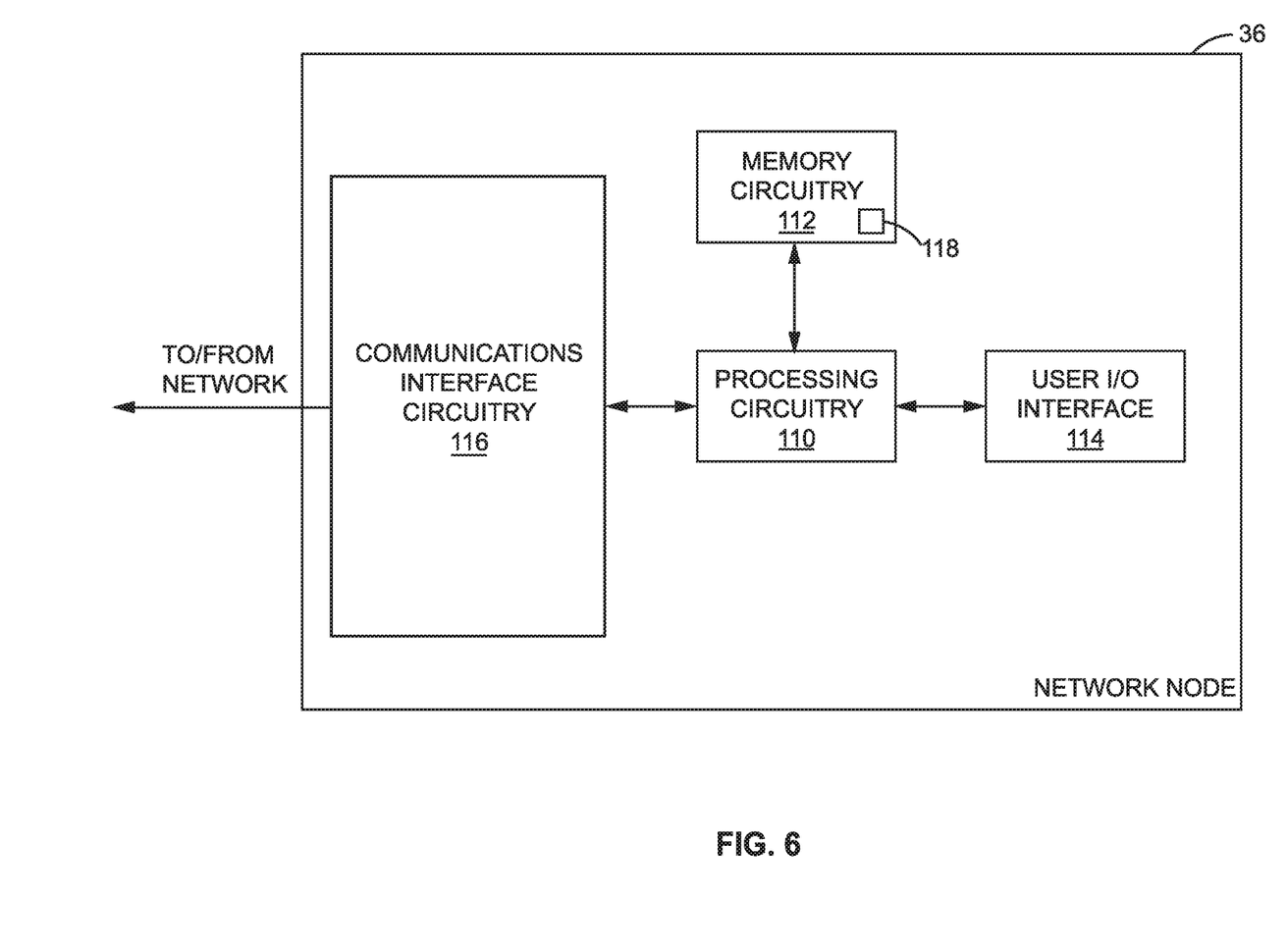
FIG. 6 is schematic block diagram illustrating some of the component parts of a network node configured to determine a recommended product and indicate that recommended product to a customer according to one embodiment of the present disclosure.

FIG. 6 is schematic block diagram illustrating some of the component parts of a network node 36 configured to determine a recommended product and indicate that recommended product to a customer according to one embodiment of the present disclosure. Those of ordinary skill in the art should appreciate that the components illustrated in FIG. 6 are merely exemplary, and that network node 36 may comprise other components not explicitly shown in FIG. 6.

As seen in FIG. 6, network node 36 is a computer device and comprises processing circuitry 110, memory circuitry 112 storing a control program 118, a user input/output (I/O) interface 114, and a communications interface circuit 116. Processing circuitry 110 comprises one or more microprocessors, hardware circuits, firmware or a combination thereof. In the exemplary embodiments described herein, processing circuitry 110, as previously described, is configured to determine a recommended product for a customer based on tags categorizing a product previously provided by the customer, and indicate that recommended product to a customer. Additionally, as previously described, processing circuitry 110 is configured to generate a control message and one or more subsequent position update messages, and send those messages to the customer's mobile device 26 to communicate the recommendation to the customer.

Memory circuitry 112 comprises a non-transitory computer readable medium that stores executable program code and data used by the processing circuitry 110 for operation. In this embodiment, the program code and data comprises a control program 118 that, when executed by processing circuitry 110, configures network node 36 to perform the functions previously described. In some embodiments, control program 118 has access to customer preference information that, as previously described, can be utilized to determine a recommended product for the customer. Memory circuitry 112 may include both volatile and non-volatile memory, and may comprise random access memory (RAM), read-only memory (ROM), and electrically erasable programmable ROM (EEPROM) and/or flash memory. Additionally or alternatively, memory circuitry 112 may comprise discrete memory devices, or be integrated with one or more microprocessors in the processing circuitry 110.

The user I/O interface 114 comprises one or more input devices and display devices to enable a user to interact with and network node 36. Such devices may comprise any type of device for inputting data into a computing device including, but not limited to, keyboards, number pads, push buttons, touchpads, touchscreens, or voice activated inputs. The display devices that comprise user I/O interface 114 may comprise, for example, a liquid crystal display (LCD) or light emitting diode (LED) display, or a touchscreen display that also functions as a user input device.

The communications interface circuitry 116 comprises, in one embodiment, a transceiver circuit and/or interface circuit for communicating with remote devices, such as the customer's computer 24, the customer's mobile device 26, DB 38, and the one or more POS devices 34 in the retail store. For example, using communications interface circuitry 116, network node 36 can receive, as previously described:

- digital images from one or more cameras distributed throughout the store;
- data and information from DB 38; and
- data and information (e.g., the customer-provided tags) from the customer's computer 24, mobile device 26, and the one or more POS devices 34.

In this regard, the communications interface circuitry 116 according to embodiments of the present disclosure may comprise a WiFi interface, a cellular radio interface, a BLUETOOTH interface, an Ethernet interface, or other similar interface for communicating over a communication network or a wireless communication link.

Figure 7:
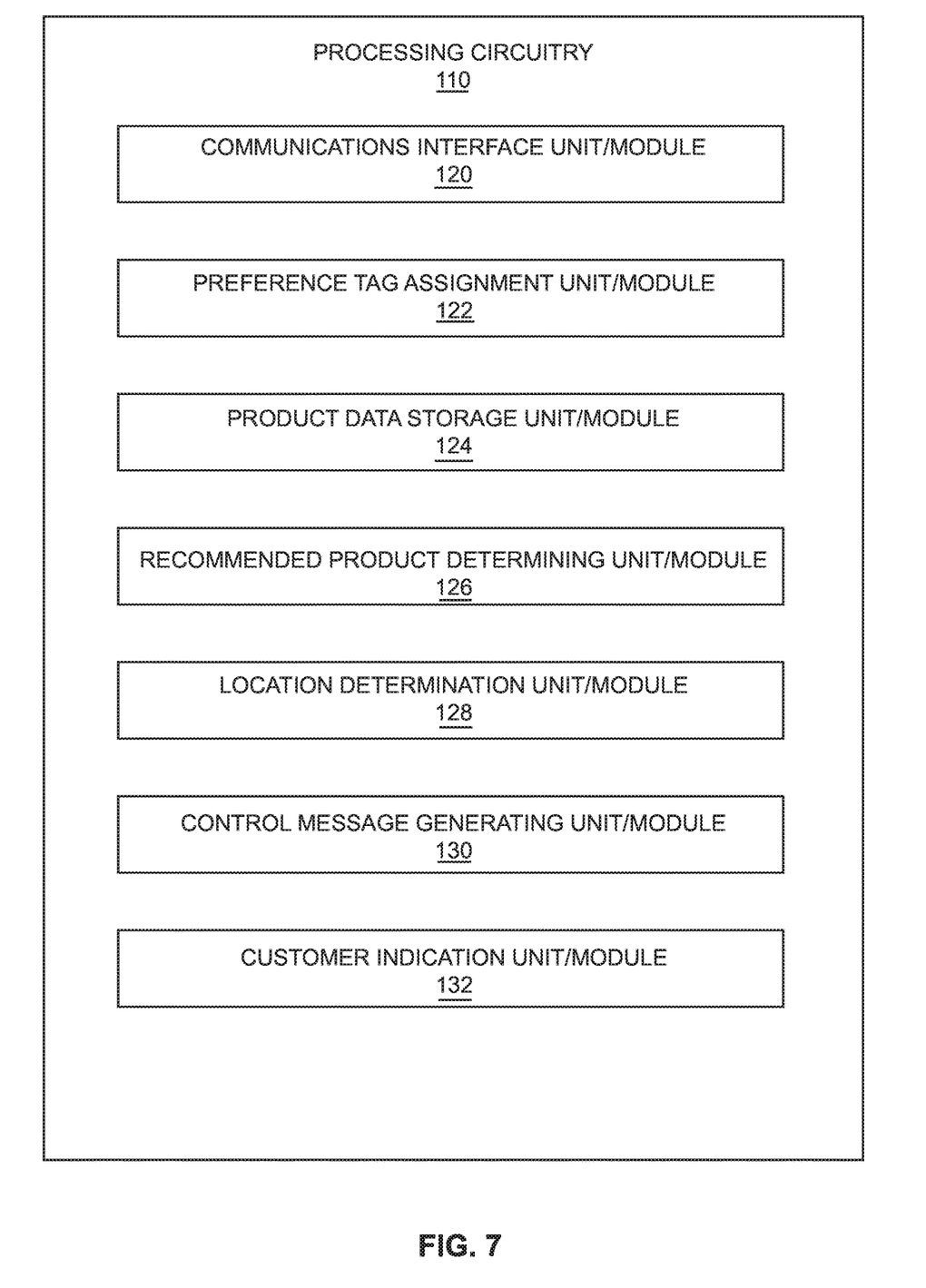
FIG. 7 is a schematic block diagram of a computer program product that configures a computer to determine a recommended product and indicate that recommended product to a customer according to one embodiment of the present disclosure.

FIG. 7 is a schematic block diagram of a computer program product that when executed on processing circuitry 110 configures a computer, such as network node 36, to determine a recommended product and indicate that recommended product to a customer according to one embodiment of the present disclosure. As seen in FIG. 7, the computer program product comprises a plurality of units/modules including a communications interface unit/module 120, preference tag assignment unit/module 122, a product data storage unit/module 124, a recommended product determining unit/module 126, a location determination unit/module 128, a control message generating unit/module 130, and a customer indication unit/module 132.

The communications interface unit/module 120 comprises program code that is executed by processing circuitry 110 to facilitate communicating data and information with one or more remote devices via one or more communications networks. Such devices include, but are not limited to, computer 24, mobile device 26, POS devices 34, and DB 38 via IP network 22 and/or 32. As described above, such data and information includes, but is not limited to, alpha-numeric "tags" that are analyzed by processing circuitry 110 and used to recommend a product to a customer.

The preference tag assignment unit/module 122 comprises program code that is executed by processing circuitry 110 to assign the alpha-numeric tags provided by the customer to a corresponding product. As stated above, processing circuitry 110 assigns the tag provided by the customer to the product by associating the tag with the SKU of the product and storing that association in DB 38.

The product data storage unit/module 124 comprises program code that is executed by processing circuitry 110 to store data records associated with the products sold by the retail store. Such records also include the tags provided by the customers and assigned to the products indicating whether the customer is interested in other, similar products.

The recommended product determining unit/module 126 comprises program code that is executed by processing circuitry 110 to analyze the data records maintained by the product data storage unit/module 124, and to determine, based on the results of that analysis, a product to be recommended to the customer.

The location determination unit/module 128 comprises program code that is executed by processing circuitry 110 to determine the customer's current position in the retail store, as well as the location of the recommended product in the retail store relative to the customer's current position. In some cases, the location determination unit/module 128 also comprises program code that, when executed by processing circuitry 110, generates the data indicating a path from the customer's current position to the location of the recommended product.

The control message generating unit/module 130 comprises program code that is executed by processing circuitry 110 to generate the control message to be sent to the customer's mobile device 26, as well as the intermediate position update messages. The customer indication unit/module 132 comprises program code that is executed by processing circuitry 110 to send the control message and the position update messages to mobile device 26 via the communications interface unit/module 120.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method for recommending retail products to a customer, wherein the method is implemented by a network node associated with a retail store and comprises:
   storing personalized purchasing information identifying one or more products purchased by a customer, wherein each product is associated with one or more preference tags, with each preference tag identifying a respective product category and indicating the customer's preference for products in that product category;
   determining a recommended product for the customer to purchase based on the preference tags wherein determining the recommended product comprises selecting the recommended product from the product category having the most preference tags assigned during a predetermined time period;
   generating a control message to send to the customer's wireless communication device, wherein the control message is configured to:
   indicate the recommended product to the customer; and
   control the customer's wireless communication device to launch a Graphical User Interface (GUI) visually indicating:
   a location of the recommended product in the retail store; and
   a current position of the customer relative to the location of the recommended product in the retail store; and
   sending the control message to the customer's wireless communication device.

2. The method of claim 1 further comprising determining the current position of the customer in the retail store.

3. The method of claim 2 wherein generating the control message to send to the customer's wireless communication device comprises generating the control message to comprise information indicating the location of the recommended product in the retail store and the current position of the customer in the retail store.

4. The method of claim 3 wherein the control message is generated to further comprise information indicating a path through the retail store from the current position of the customer in the retail store to the location of the recommended product in the retail store.

5. The method of claim 3 wherein the control message is generated to further comprise a command that controls the customer's wireless communication device to launch the GUI upon receipt of the control message at the customer's wireless communication device.

6. The method of claim 4 further comprising generating one or more position update messages to send to the customer's wireless communication device, wherein each position update message indicates an updated position of the customer in the retail store relative to the recommended product, and controls the customer's wireless communication device to refresh the GUI to visually indicate the updated position of the customer.

7. The method of claim 1 further comprising:
   receiving, from the customer, a first preference tag to be assigned to a given product being purchased by the customer; and
   assigning the preference tag to the given product responsive to receiving the customer input.

8. The method of claim 7 wherein assigning the preference tag to the given product comprises associating the preference tag to a stock keeping unit (SKU) of the given product.

9. The method of claim 7 wherein at least one of the preference tags comprises arbitrary text indicating a product category.

10. The method of claim 1 further comprising receiving update information from the customer, wherein the update information modifies the one or more preference tags.

11. A computing device configured to recommend retail products to a customer, the computing device comprising:
   communications circuitry configured to communicate messages with one or more devices via a communications network; and
   processing circuitry communicatively connected to the communications circuitry and configured to:

store personalized purchasing information identifying one or more products purchased by a customer, wherein each product is associated with one or more preference tags, with each preference tag identifying a respective product category and indicating the customer's preference for products in that product category;

determine a recommended product for the customer to purchase based on the preference tags, wherein to determine the recommended product the processing circuitry selects the recommended product from the product category having the most preference tags assigned during a predetermined time period;

generate a control message to send to the customer's wireless communication device, wherein the control message is configured to:

indicate the recommended product to the customer; and control the customer's wireless communication device to launch a Graphical User Interface (GUI) visually indicating:

a location of the recommended product in the retail store; and a current position of the customer relative to the location of the recommended product in the retail store; and send the control message to the customer's wireless communication device.

12. The computing device of claim 11 wherein the processing circuitry is further configured to:

determine the current position of the customer in the retail store; and generate the control message to comprise information indicating the location of the recommended product in the retail store and the current position of the customer in the retail store.

13. The computing device of claim 12 wherein the control message is generated to comprise information indicating a path through the retail store from the current position of the customer in the retail store to the location of the recommended product in the retail store.

14. The computing device of claim 13 wherein the processing circuitry is further configured to generate one or more position update messages to send to the customer's wireless communication device, wherein each position update message indicates an updated position of the customer in the retail store relative to the recommended product, and controls the customer's mobile device to refresh the GUI to visually indicate the updated position of the customer.

15. The computing device of claim 11 wherein the processing circuitry is further configured to:

receive, from the customer, a first preference tag to be assigned to a given product being purchased by the customer; and assign the preference tag to the given product responsive to receiving the customer input.

16. The computing device of claim 15 wherein to assign the preference tag to the given product, the processing circuitry is configured to associate the preference tag to a stock keeping unit (SKU) of the given product.

17. The computing device of claim 11 wherein at least one of the preference tags comprises arbitrary text provided by the customer.

18. A non-transitory computer readable medium storing program code that, when executed by a processing circuit of a computing device associated with a retail store, causes the computing device to:

store personalized purchasing information identifying one or more products purchased by a customer, wherein each product is associated with one or more preference tags, with each preference tag identifying a respective product category and indicating the customer's preference for products in that product category;

determine a recommended product for the customer to purchase based on the preference tags, wherein to determine the recommended product the program code controls the processing circuit to select the recommended product from the product category having the most preference tags assigned during a predetermined time period; and generate a control message to send to the customer's wireless communication device, wherein the control message is configured to:

indicate the recommended product to the customer; and control the customer's wireless communication device to launch a Graphical User Interface (GUI) visually indicating:

a location of the recommended product in the retail store; and a current position of the customer relative to the location of the recommended product in the retail store; and send the control message to the customer's wireless communication device.

* * * * *